May 8, 1962

R. MOUCHON 3,033,052

BALANCED SPEED-VARYING MECHANISM

Filed Dec. 30, 1960

INVENTOR
RAOUL MOUCHON

BY *Henry E Otto Jr*

ATTORNEY

May 8, 1962 R. MOUCHON 3,033,052
BALANCED SPEED-VARYING MECHANISM
Filed Dec. 30, 1960 3 Sheets-Sheet 2

United States Patent Office 3,033,052
Patented May 8, 1962

3,033,052
BALANCED SPEED-VARYING MECHANISM
Raoul Mouchon, Choisy-le-Roi, France, assignor to International Business Machines Corporation, New York, N.Y., a corporation of New York
Filed Dec. 30, 1960, Ser. No. 79,748
Claims priority, application France Jan. 28, 1960
2 Claims. (Cl. 74—393)

This invention relates to speed-varying mechanisms for converting uniform rotary motion into non-uniform rotary motion, and relates more particularly to an improved statically and dynamically balanced mechanism of the above type wherein a constant speed rotary input member operatively drives a rotary output member at a speed which is or may be constant during only a part of a revolution and in such manner that both such members complete a full revolution in the same time interval.

Various types of speed-varying mechanisms are known. In Geneva-type mechanisms, for example, the output or driven member is rotated an increment less than a complete revolution for each complete revolution of the input or drive member. Acceleration and deceleration of the driven member change rapidly during the period the drive pin of the driver engages the driven member. This causes shock vibration and wear which not only result in undesirable noise but also reduce the useful life of the mechanism. These and other types of speed-varying or variable speed mechanisms heretofore proposed are not capable of operating satisfactorily at high rotational speeds.

The principal object of this invention is therefore to provide an improved speed-varying mechanism which is statically and dynamically balanced, requires less clearance and is capable of operating satisfactorily at higher input and output rotational speeds than mechanisms heretofore proposed, and is relatively inexpensive and easy to assemble. According to the invention, the improved speed-varying mechanism comprises an input shaft which is rotated at constant speed and is connected to and drives a plurality of cams. Each cam continuously contacts a corresponding one of a plurality of circular followers uniformly offset eccentrically relative to and carried by an output shaft, thereby to cause the output shaft to be rotated non-uniformly according to the overall profile of the cams. The input and output shafts thus rotate complete revolutions in the same time interval, but the speed of the output shaft varies whereas that of the input shaft is constant. The followers preferably are in the form of ball bearings having inner races immovably secured to a disc eccentrically secured to the output shaft and outer races which can rotate freely relative to said disc and shaft so as not to "scuff" on the cams. Since the outer races can rotate freely, different points on the followers can make contact with the cams to minimize wear. In other words, if each follower merely consisted of a disc eccentrically affixed to the output shaft, the same surface of the disc would contact the associated cam during successive revolutions and thus concentrate the wear on such surface. The cams and followers are combined and arranged in such manner that the output shaft may be rotated at a constant speed, higher than the input shaft speed, during one part of its revolution and at a constant lower speed (or at zero speed) during another part of such revolution and smoothly decelerated and accelerated between such extremes of speed.

The foregoing and other objects, features and advantages of the invention will be apparent from the following more particular description of a preferred embodiment of the invention, as illustrated in the accompanying drawings.

Figure 4:
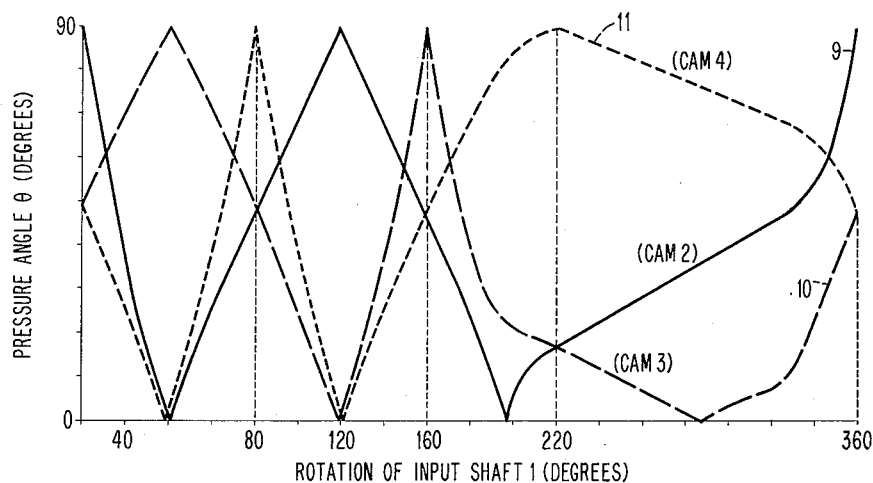
Figure 5:
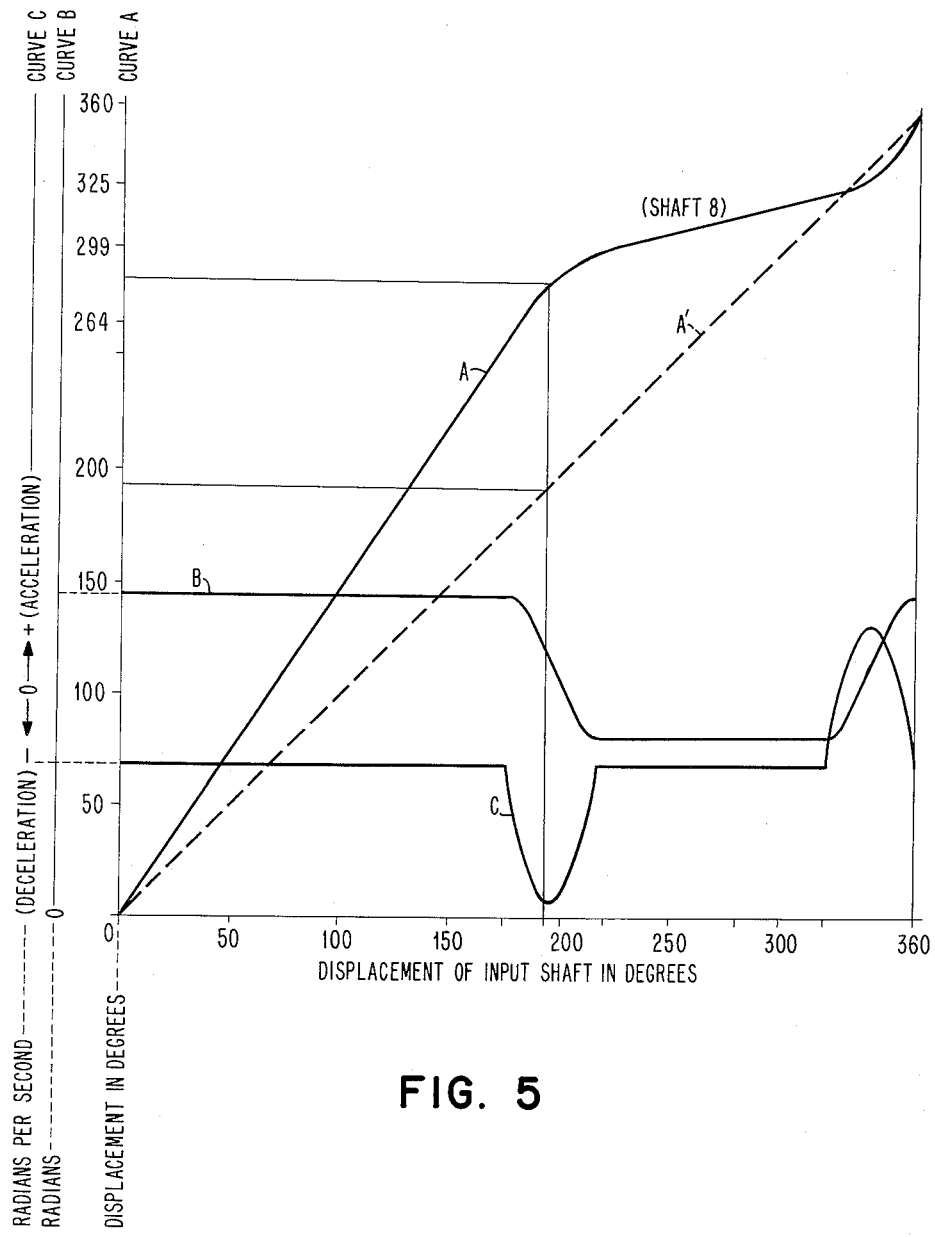

FIG. 4 is a pressure angle vs. time curve showing the variations in pressure angle between the respective sets of cams and followers during a complete revolution of the input shaft; and FIG. 5 is a composite curve showing a comparison of the displacement rotation of the output shaft with that of the input shaft, the rotational velocity of the output shaft, and the acceleration and deceleration of the output shaft.

Description

Figure 1:
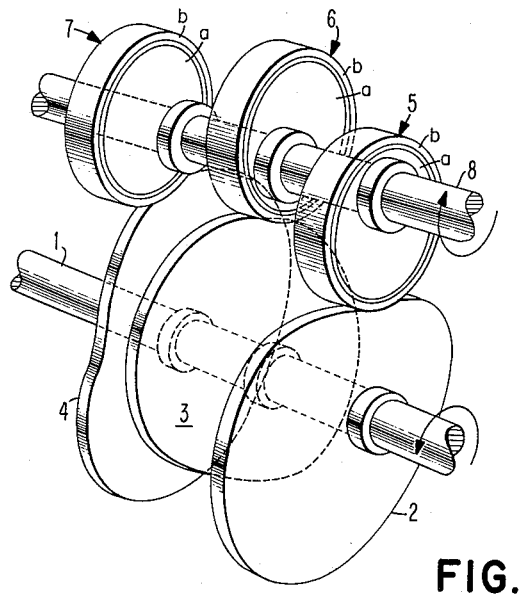
FIG. 1 is a perspective view of a speed-varying mechanism embodying the invention.
Figure 2:
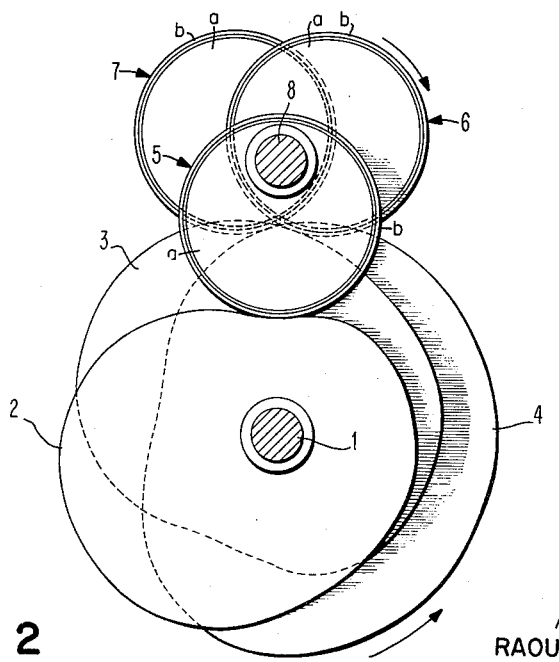
FIG. 2 is an end elevation view of the mechanism as viewed from the right-hand side of FIG. 1.

Referring to FIGS. 1 and 2, the improved mechanism comprises an input shaft 1 rotated at constant speed by suitable means (not shown). Three axially adjacent cams 2, 3, 4 are fixed to shaft 1 for rotation thereby. Cams 2, 3, 4 constantly contact followers 5, 6, 7 respectively, which are mounted on an output shaft 8 connected to drive suitable means (not shown) at varying speed and according to a predetermined sequential pattern.

The cams 2, 3, 4 are of such configuration and mass and so mounted on the input shaft 1 that they will be both statically and dynamically balanced. Followers 5, 6, 7 are preferably of identical circular shape and eccentrically mounted on the shaft 8 in uniformly offset circumferential relation, such that, as illustrated, the high points of the followers farthest from the axis of shaft 8 will be 120° apart, and thus statically and dynamically balanced. Hence the mechanism will be both statically and dynamically balanced.

Each of the followers 5, 6, 7 preferably comprises a circular disc $a$ (see FIG. 1) secured to the output shaft 8 and a ball bearing $b$ press fit over the disc so that the outer race of the bearing can rotate freely relative to the disc and inner race. This prevents each follower from "scuffing" on its corresponding cam, which could otherwise occur because the followers and their corresponding cams are in constant contact.

Figure 3:
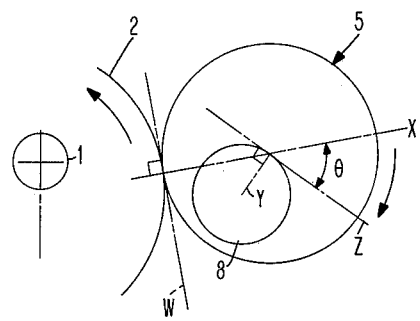
FIG. 3 is a layout view of one set of the cams and followers illustrated in FIG. 1, showing the manner of deducing the pressure angle between the cam and follower of said set.

The pressure angle $\theta$ between, for example, cam 2 and its follower 5 at a particular point in the cycle (different from that in which they are shown in FIG. 2) is deduced as shown in FIG. 3. As shown in this figure, a line $w$ is drawn tangent to the point of contact of cam 2 and follower 5. Then a line $x$ is drawn perpendicular to line $w$. Next, a line $y$ is drawn connecting the centers of output shaft 8 and follower 5. A line $z$ is then drawn perpendicular to line $y$. The pressure angle $\theta$ is the angle defined between lines $x$ and $z$. Hence, when the cam 2 and follower 5 are positioned as shown in FIG. 2, the pressure angle $\theta$ is substantially ninety degrees.

The values of the pressure angles $\theta$ between the various cams and their respective followers throughout a complete revolution of the input shaft 1 are shown in FIG. 4. Curves 9, 10 and 11 respectively correspond to the values of the pressure angles $\theta$ between cams 2, 3, 4 and their respective followers 5, 6, 7. Motion of the output shaft 8 is controlled at any one time in the cycle by either one or two of the cams 2, 3, 4. For example, in the embodiment illustrated and as shown in FIG. 4, motion of the output shaft is controlled during the following periods of rotation of input shaft 1: by cams 2 and 3 from 0° to 40°, then by cam 2 alone to 80°, then by cams 2 and 4 till 120°, then by cam 4 alone till 160°, then by cams 2 and 3 till 220°, then by cam 3 alone till 360°.

In FIG. 5 curve A represents the rotational displacement of the output shaft 8 relative to that of input shaft 1. Rotational displacement of input shaft 1 with respect to iself is denoted by broken line A' to facilitate comparison of the relative displacements of the two shafts 8, 1. Curve B, to a different ordinate scale expressed in such as radians, shows the velocity of the output shaft 8 during a complete revolution of the input shaft 1. Curve C denotes, to a different ordinate scale, the deceleration and acceleration of the output shaft 8 during a complete revolution of the input shaft 1.

In operation, as the input shaft 1 rotates the respective cams 2, 3, 4, the cams will act through the followers 5, 6, 7, respectively, to rotate the output shaft 8. As input shaft 1 rotates at a constant speed, the output shaft 8 will roate at a varying speed as denoted by curve B in FIG. 5. However, a complete revolution of shaft 1 will effect a complete revolution of output shaft 8 (see curve A, FIG. 5). At any given instant, the output shaft 8 may desirably slip slightly relative to the input shaft 1 due to the provision of ball bearings $b$ as part of the followers 5, 6, 7. As illustrated, the cams 2, 3, 4 are of different configurations or profiles so that the pressure angles $\theta$ will vary as shown in FIG. 4 and motion of the output shaft 8 will be controlled as shown in FIG. 5.

It is apparent that any number of cams and uniformly circumferentially spaced followers may be used, and that any number of speed-varying devices of the type herein disclosed may be connected serially. Also, since the followers 5, 6, 7 comprise ball bearings, friction and scuffing of the cams by their followers is practically eliminated. It will also be noted that the cams and follower can and are arranged in such manner as to provide a statically and dynamically balanced mechanism. The cams may be of configurations different than herein disclosed and still provide the balanced feature. Also, if desired, cams may be employed which during a part of each revolution of the input shaft 1 will create a dwell or stop period during which the output shaft 8 does not rotate; in such case the curve A (FIG. 5) would have a horizontal portion as viewed in FIG. 5 of a length corresponding to the desired dwell period.

The speed-varying mechanism may be used, for example, in data processing machines to control feeding of forms (such as record cards, continuous forms or tape or bank checks) which are to be printed, punched or sensed. To provide stationary dwell periods for such as printing or punching, the cams could have true radius portions concurrently contacted by each follower during such period.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Speed-varying mechanism comprising, in combination, an input shaft rotated at constant speed, a plurality of cams rotatably carried by said input shaft, an output shaft, and a plurality of followers each for continuously contacting a respective one of said cams, each of said followers being eccentrically carried by the output shaft and of substantially identical configuration and having their respective high points offset equal arcuate distances from each other, said cams being of different configurations cut to provide a constant different speed of the output shaft during only a part of the full revolution of the input shaft, whereby the output shaft will be subjected to varying rotational speeds and accelerations during a full revolution of the input shaft and both shafts will complete a full revolution in the same time interval.

2. Speed-varying mechanism comprising, in combination, an input shaft rotated at constant speed, a plurality of cams rotatably carried by said input shaft, an output shaft, and a plurality of followers eccentrically carried by the output shaft and continuously contacting a respective one of said cams, said cams and their corresponding followers being of such configurations as to provide a constant different speed of the output shaft during a part of a complete revolution of the input shaft and cause both shafts to complete a full revolution in the same time interval.

References Cited in the file of this patent

UNITED STATES PATENTS

| | | |
|---|---|---|
| 2,650,500 | Stibitz | Sept. 1, 1953 |
| 2,770,145 | Stibitz | Nov. 13, 1956 |
| 2,957,363 | Ingham et al. | Oct. 25, 1960 |